(12) United States Patent
Poole et al.

(10) Patent No.: US 12,020,090 B2
(45) Date of Patent: Jun. 25, 2024

(54) SHARING DATA STRUCTURE VALUES BETWEEN SOFTWARE APPLICATIONS

(71) Applicant: International Business Machines Corporation, Armonk, NY (US)

(72) Inventors: Christopher John Poole, Romsey (GB); Thomas James Waterton, Southampton (GB); Joseph Peter Kent, Stockbridge (GB)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 17/089,326

(22) Filed: Nov. 4, 2020

(65) Prior Publication Data

US 2022/0138026 A1    May 5, 2022

(51) Int. Cl.
  *G06F 9/54*  (2006.01)
  *G06F 9/445*  (2018.01)
  *G06F 16/901*  (2019.01)

(52) U.S. Cl.
  CPC .......... *G06F 9/546* (2013.01); *G06F 9/44505* (2013.01); *G06F 16/901* (2019.01)

(58) Field of Classification Search
  None
  See application file for complete search history.

(56) References Cited

U.S. PATENT DOCUMENTS

| | | | |
|---|---|---|---|
| 8,850,451 B2 * | 9/2014 | Bhogal | G06F 9/541 |
| | | | 719/313 |
| 8,949,348 B2 | 2/2015 | Banks | |
| 9,325,645 B2 | 4/2016 | Wu | |
| 10,467,622 B1 | 11/2019 | Rule | |
| 2008/0109464 A1 | 5/2008 | Ozzie | |
| 2008/0256014 A1 * | 10/2008 | Gould | G06N 5/04 |
| | | | 706/48 |
| 2014/0067814 A1 * | 3/2014 | Palmert | G06F 16/285 |
| | | | 707/738 |

(Continued)

FOREIGN PATENT DOCUMENTS

| | | |
|---|---|---|
| CN | 114528115 A | 5/2022 |
| JP | 2022075601 A | 5/2022 |

OTHER PUBLICATIONS

"NSDataDetector", Apple Developer Documentation, last printed Nov. 2, 2020, 5 pages, <https://developer.apple.com/documentation/foundation/nsdatadetector?changes=_3>.

*Primary Examiner* — Chat C Do
*Assistant Examiner* — William C Wood
(74) *Attorney, Agent, or Firm* — Michael A. Petrocelli

(57) ABSTRACT

The present disclosure provides for sharing data structure values between applications via messaging in a computer operating system. A plurality of data structures are defined, each with a given topic name, and a data structure including a collection of defined formats of multiple data elements. Interest by applications in topics is registered. Within an application a collection of multiple data elements having the formats of a defined data structure are identified, and an item is stored in association with the given topic name of the defined data structure, where the item is a collection of data values of the identified data elements. The item is made available to an application registered to the topic for input of the values in a corresponding data structure in the application.

18 Claims, 4 Drawing Sheets

(56) References Cited

U.S. PATENT DOCUMENTS

| | | | |
|---|---|---|---|
| 2014/0223318 A1* | 8/2014 | Pefferle | H04N 1/00159 |
| | | | 715/738 |
| 2015/0039651 A1* | 2/2015 | Kinsely | G06F 16/254 |
| | | | 707/779 |
| 2016/0119633 A1* | 4/2016 | Neuman | H04L 67/141 |
| | | | 375/240.02 |
| 2017/0053647 A1* | 2/2017 | Nichols | G10L 15/22 |
| 2018/0359201 A1* | 12/2018 | Rangasamy | G06F 11/30 |
| 2019/0130306 A1* | 5/2019 | Singh | G06N 20/00 |
| 2019/0188251 A1 | 6/2019 | Liu | |
| 2020/0125680 A1* | 4/2020 | Uzonyi | G06F 16/337 |
| 2020/0210255 A1* | 7/2020 | Shen | G06F 9/546 |
| 2022/0092231 A1* | 3/2022 | Shen | G06F 30/20 |

\* cited by examiner

SHARING DATA STRUCTURE VALUES BETWEEN SOFTWARE APPLICATIONS

BACKGROUND

The present invention relates to sharing data structure values between software applications, and more specifically, to sharing data structure values between applications via messaging in an operating system.

A user of a computing device may wish to use details that they have received in one application in another application on their device. An example of this is when a user receives banking information via a message and wants to enter the banking information into a banking application to make a payment. The banking information is made up of several fields including at least the account name, sort number, and account number.

One option is for the user to make a note of the banking information separately to refer to whilst switching application. Another option is for the use to make copy and paste actions for each value of the banking information. A simple copy and paste would need to be carried out in three parts between the messaging application and the banking application in order to transfer the information.

SUMMARY

According to an aspect of the present invention there is provided a computer-implemented method for sharing data structure values between applications via messaging in an operating system, comprising: defining a plurality of data structures each with a given topic name, a data structure including a collection of defined formats of multiple data elements; registering interest by applications in topics; identifying within an application a collection of multiple data elements having the formats of a defined data structure and storing an item in association with the given topic name of the defined data structure, wherein the item is a collection of data values of the identified data elements; and making the item available to an application registered to the topic for input of the values in a corresponding data structure in the application.

According to another aspect of the present invention there is provided a system for sharing data structure values between applications via messaging in an operating system, comprising: a processor and a memory configured to provide computer program instructions to the processor to execute the function of the components of a data value transfer system: a data structure defining component for defining a plurality of data structures each with a given topic name, a data structure including a collection of defined formats of multiple data elements; a topic component for registering interest by applications in topics; an identifying component for identifying within an application a collection of multiple data elements having the formats of a defined data structure; an item storing component for storing an item in association with the given topic name of the defined data structure, wherein the item is a collection of data values of the identified data elements; and an item access component for making the item available to an application registered to the topic for input of the values in a corresponding data structure in the application.

According to a further aspect of the present invention there is provided a computer program product for sharing data structure values between applications via messaging in an operating system, the computer program product comprising a computer readable storage medium having program instructions embodied therewith, the program instructions executable by a processor to cause the processor to: define a plurality of data structures each with a given topic name, a data structure including a collection of defined formats of multiple data elements; register interest by applications in topics; identify within an application a collection of multiple data elements having the formats of a defined data structure and storing an item in association with the given topic name of the defined data structure, wherein the item is a collection of data values of the identified data elements; and make the item available to an application registered to the topic for input of the values in a corresponding data structure in the application.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

Figure 1:
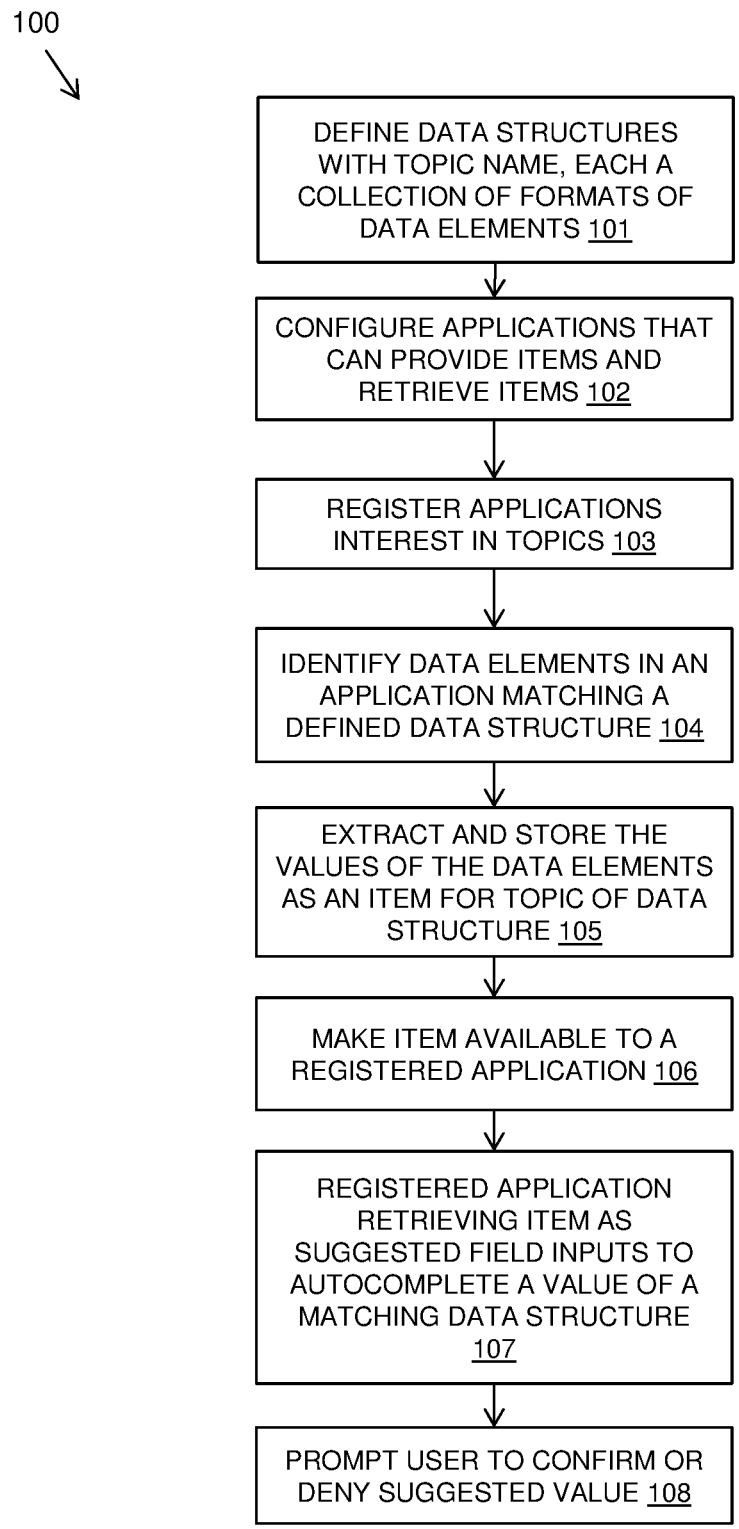
FIG. 1 is a flow diagram of an example embodiment of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system use a messaging system at a computer operating system level to share values of defined data structures between applications running on the operating system. A defined data structure has a collection of multiple data elements of defined format and a given topic name that is used as the messaging topic for sharing values of the data elements of the defined data structure. Messaging topics are defined for data structures of collections of data that may be required to be shared between applications.

The messaging system may involve applications expressing an interest in topic and items in the form of a collection of data values of the identified data elements are obtained from an application, stored in association with a topic name, and made available to other applications that have an interest in the topic.

The messaging system may be a publish/subscribe messaging system with messages in the form of the items being published to a message topic name by an application. Other applications subscribe to topic names and receive the published item of the values.

In other embodiments, the messaging system may use another messaging pattern to share the items of data structure values for a topic. For example, instead of pushing items to a topic that any registered application can subscribe to and access the item on, a simpler messaging system may provide a topic queue for a given application and the operating system may put an item in the form of the collection of data values onto the topic queue for the application.

In a publish/subscribed messaging system, data structures are defined for which values may be temporarily stored in a publish/subscribe message topic at the operating system level. When relevant data structures are identified in an application, the values are published and stored on the operating system level message topic. Other applications running on the operating system may subscribe to this message topic to retrieve relevant data structures.

An application running on the operating system may receive or open data that conforms to a defined data structure. For example, a messaging application may receive a message with data in the form of banking details including an account name as a string of letters, a sort code as a string of 6 numerical digits, and an account number as a string of 8 numerical digits. The described method may identify the received data in the message as conforming to a defined data structure, which has a unique name (for example, "bank account"), and the values of the received data may be published to a message topic of the defined data structure and stored in a message topic queue.

For example, the other application may be a banking application and may subscribe to a message topic for bank account information. The other application may retrieve the values of the bank account information published by the messaging application and may suggest these as inputs into appropriate fields in the banking application, thus saving the user from having to either manually type in the data or manually copy and paste each constituent part separately. The defined data structure being published or subscribed to may be a block that includes structure, field names, etc., that the subscribing application can expect to be there and can parse.

Data structures may define types of data that have a recognized format. The data structures may include multiple field formats for multiple values within a data structure. The data structures may include strings of text or digits, images, metadata, Hypertext Markup Language (HTML) attributes, etc. Types of data structure may include, as examples: a banking information data structure including fields of account name, sort code, and account number; a credit card information data structure including fields of account name, account number, card security number, and expiry date; a package delivery information data structure including fields of tracking code, and post code; an identification information data structure including a field for a name and an identification or passport number; a data format including images with associated metadata, etc.

When a data structure is defined, each component within it may be labelled. For example, in the "bank account" data structure, there would be a label for account name, label for sort code, and label for account number. When an application subscribes to a "bank account" topic and retrieves the published values, it uses the internal labels to match the data components to the corresponding user interface labels in the application to insert the values into the correct fields in the user interface.

Referring to FIG. 1, a flow diagram 100 shows an example embodiment of the described method for sharing data structure values in applications via an operating system. The method is carried out at a messaging system at the operating system level.

Multiple data structures may be defined 101 as message topics with a topic name in the messaging infrastructure. The messaging topics are defined for data structures with multiple fields in the form of data elements, with each data element having a defined format. In this way, a group of related fields are defined as a single data structure. Each data structure may be for a collection of data input fields in the form of defined format such as strings of character types, media types, or other arrangements.

The data structures may be predefined at the operating system level as message topics for recognized data structure formats, such as standard banking formats, and may also be added to by an application developer and/or by an end user for more personalized data structures that the user may wish to use. This allows for customized data formats to be specified by an application developer or an end user. For example, an application developer may define their own data structure, which may then be added to the operating system level list of recognized data structures (for example, via an operating system application programming interface (OS API)). The end user may also define data structures on their local device, for example, for their own specific club membership identification format including name and number fields.

The method may configure 102 applications, at the operating system, that are permitted to send and/or receive values of a defined data structure via the messaging infrastructure. Values of the data elements of a data structure may be grouped as an item for transfer via the messaging system. Certain applications may be permitted to only send or only receive values to or from all the message topics or some of the message topics, whilst other applications may be permitted to both send and receive depending on the type and requirements of the application.

The method may register 103 applications' interest in a message topic. This may be configured at each application as to whether or not the application can provide values and can receive values for a topic. In a publish/subscribe messaging system an application may be configured to publish and/or subscribe to topics of the messaging system. Applications executing on the operating system may subscribe to a message topic for a defined data structure. Each defined data structure is given a unique topic name, and a subscribing application can declare a list of topic names that it wishes to accept. An application may subscribe to one or more message topics that relate to their functionality, such as a banking application, a browser application used for online purchases, delivery application, etc.

In another embodiment, an application may define a topic queue for a defined data structure on installation of the application and the operating system may then know to put items in the form of the collection of data values for the defined data structure directly onto the topic queue for the application.

The operating system may manage a table of applications and what topics an application has declared interest in and support for, such that when the operating system sees a matching data structure, it can find its topic name, and push that structure contents to all applications declaring support for that topic.

The method may identify 104 values that conform to the format of data elements of a defined data structure. This may be carried out by pattern recognition of the values or by using other known methods of data detection. This may use functionality of an operating system similar to known data detectors for detecting dates, addresses, etc. The values may be identified when they are entered or received in an application.

The method may extract and store 105 of the values as an item to a storage associated with the message topic for the defined data structure. For example, the item of values may be stored on the message queue. There may be various methods of controlling or limiting the data retention of items, for example, for a configured period of time and/or to a queue depth. This may be configured at the operating system level or by a user. In one example, a set of values for banking information may be stored for a short period of time only. In another example, when a retrieving application has retrieved a particular data structure, the method may be could be configured so that the application communicates back to the message queue to confirm that it has used that message (data structure instance) and so it can now be deleted.

The item may include the extracted values of the data elements of the data structure with associated labels relating to the fields of the data elements. The items may be made available 106 to the applications with a registered interest in the topic of the defined data structure. The items may be pushed to all applications that have a registered interest in a topic when a new item is available for the topic, or applications may periodically pull items from a topic.

The method may allow an application with a registered interest in the message topic to retrieve 107 the item and the values of the data elements may be used as suggested inputs to autocomplete the fields of a matching data structure in the retrieving application. The method may prompt 108 a user input to confirm or deny the suggested input.

Each data element within a defined data structure may be labelled and when an application retrieves 107 the published values, it uses the internal labels to match the data elements to the corresponding user interface labels in the application.

Figure 2:
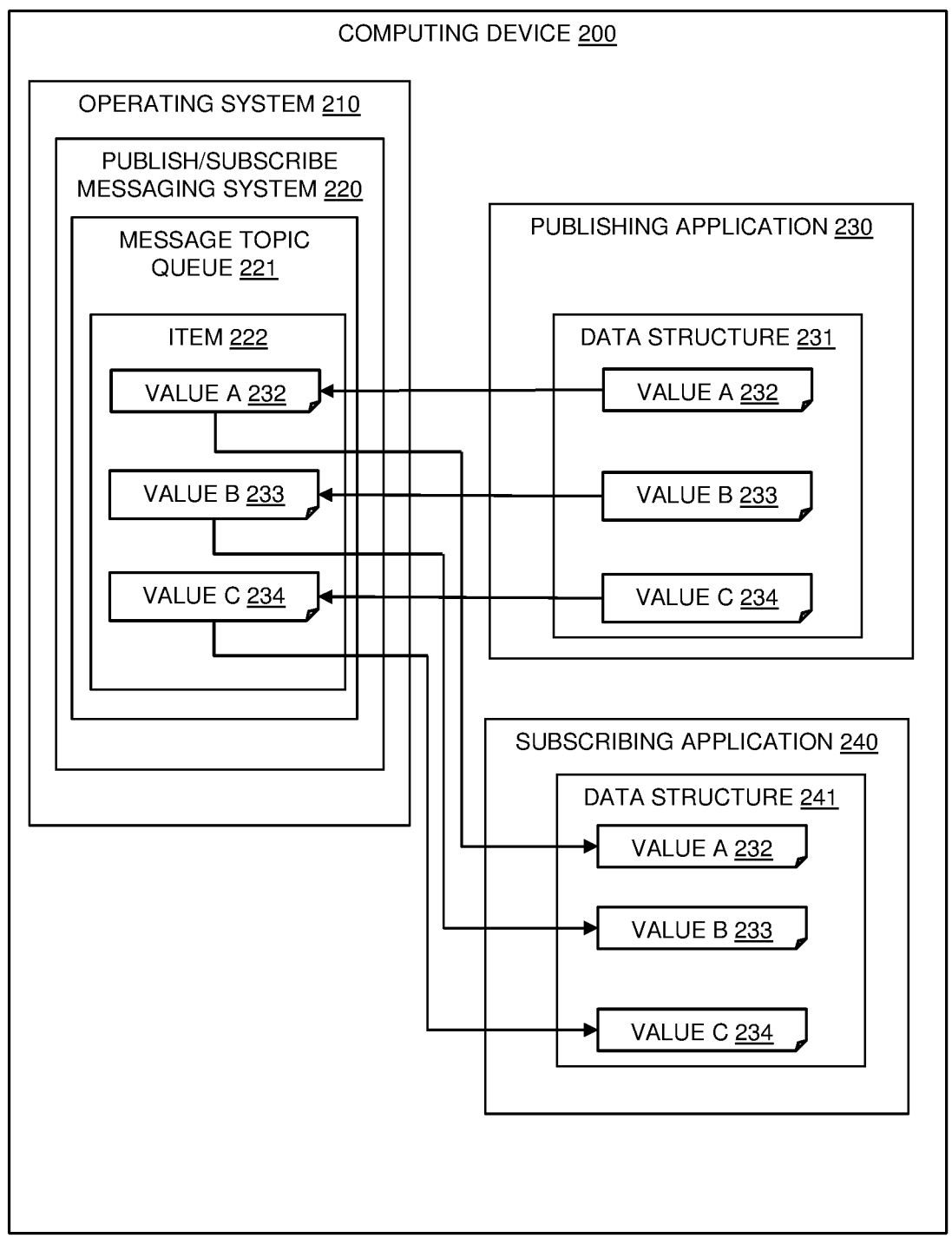
FIG. 2 is a schematic diagram illustrating an example embodiment of a method in accordance with the present invention.

Referring to FIG. 2, a schematic diagram shows an example embodiment of the described method in the context of a computing device 200 having an operating system 210 and two applications that have the roles of a publishing application 230 and a subscribing application 240 in a publish/subscribe messaging system.

The operating system 210 uses a publish/subscribe messaging system 220 providing messaging middleware functionality. The publish/subscribe messaging system 220 provides messaging where the provider of information is decoupled from the consumer of the information. Providers of information, called publishers, categorize a published message into topics and subscribers express interest in one or more topics and only receive message that are of interest.

The publish/subscribe messaging system 220 has defined message topic queues 221 for different defined data structures. In this example, message topic may be for a data structure for banking information.

A publishing application 230 may have text, fields of data, or images, that conform to a defined data structure format. In this example, a data structure 231 may be banking information of a recognized format having multiple values A 232, value B 233, value C 234 of data in the recognized format.

In the case of account information, the text follows a set format of:
 account name: xxxxx (4-18 characters) (Value A 232)
 account number: xxxxxx (8 digits) (Value B 233)
 sort code: xx-xx-xx (6 digits) (Value C 234)

The publishing application 230 may, for example, be a messaging application or email application that has received a person's banking information via a text message or a text-based document that has been opened in a text-editing application. The values 232, 233, 234 are published as an item 222 to the message topic queue 221 for the data structure. In some embodiments, data values may be detected and retrieved from an image using optical character recognition, for example, where bank details have been captured as a screen shot.

A subscribing application 240 may subscribe to the message topic queue 221 as it is a banking application that has fields in which the values are required to be entered in an equivalent data structure 241. The subscribing application 240 may be opened and the user may interact with a form that matches the data structure. The item 222 with values 232, 233, 234 from the message topic queue 221 may be published to the subscribing application 240 to make them available for auto-complete within the appropriate fields in the subscribing application 240. If the data structure is accepted/selected by the user, it may then be used to automatically populate the relevant values into the relevant form fields in the banking application.

In the simpler embodiment of a topic queue provided at an application, an example may be a banking application that defines a topic queue of "account details" to use on installation of the banking application. The operating system will know to put groupings that match a defined "account details" data structure onto the topic queue for the banking application.

The data format of the data elements is not restricted to strings of text or digits. For example, a user may want to copy and paste a digital image from one application to another, an image data structure may be identified that would include not only the digital image, but also any associated HTML attributes, such as the text defined in the image "alt" attribute. Just as with the other examples, the benefit of this would be that it would facilitate the copying and pasting (or auto-suggesting) of a related set of data, not just a single piece at a time.

The data sharing using the described method may be used in a similar manner to that of location services provided at the operating system level for use in applications. There may be an operating system configuration option for applications to choose whether or not they want to make use of this data sharing functionality.

The user may also be given the option to choose which applications (of those that support the functionality) are permitted to do so on the user's device. For example, the user may decide to allow this function on certain applications but not on others. Queue depth and message retention time may be configured, as required.

Due to the nature of storing the data structures and subscribing to using them, the described method collects suitable data structures for quick, automatic reuse. The described method generates dynamic form objects to make data entry easier.

The method may be applied to any scenario where there is a known, standard data structure used (for example, banking details, personal identification sources, credit cards, club membership, delivery tracking codes, etc.).

Figure 3:
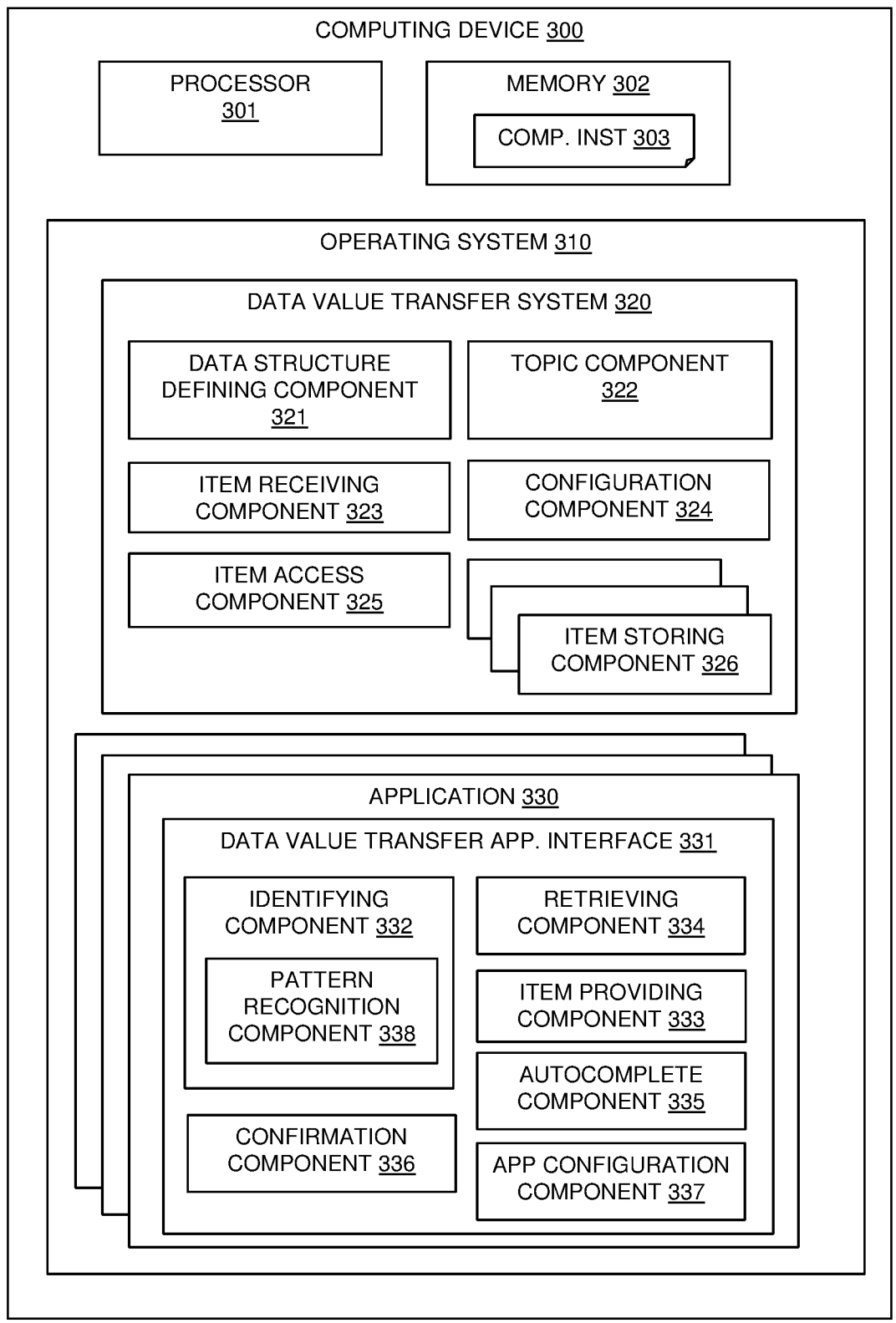
FIG. 3 is block diagram of an example embodiment of a system in accordance with the present invention.

Referring to FIG. 3, further details of components of a data value transfer system 320 providing the messaging system for data values provided on an operating system 310 of a computing device 300 are described.

The computing device 300 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The data value transfer system 320 may use a messaging infrastructure such as a publish/subscribe messaging system. The data value transfer system 320 may include a data value transfer application interface 331 for providing functionality in applications 330 relating to the transfer of the data values.

Applications 330 that may run on the operating system 310 may have the function of providing values of a defined data structure or retrieving the values, for example, as publishing applications and/or subscribing application. The applications 330 may be downloaded onto the computing device 300 or may be web applications accessed from a remote server.

The data value transfer system 320 may include a data structure defining component 321 for defining multiple data structures as message topics and a configuration component 324 for configuring applications for providing values and retrieving values and for defining data structures for topics.

The data value transfer system 320 may include a topic component 322 for registering interest by applications in topics.

An item receiving component 323 for extracting and receiving an item of values of the data elements of a data structure from an application 330 and an item storing component 326 for storing an item in association with a given topic name of the defined data structure. Multiple item storing components 326 may be provided for storing items of values for each topic for a configured period of time and/or to a queue depth.

An item access component 325 may be provided for making the item available to an application 330 registered to the topic for input of the values in a corresponding data structure in the application 330.

In a publish/subscribe messaging system, the time receiving component 323 may be a publishing component and the item access component 325 may be a subscription component and the item storing component 326 may be a topic message queue.

The data value transfer application interface 331 may provide an identifying component 332 for identifying data elements of a defined data structure at an application 330, for example, using a pattern recognition component 338 for identifying within an application a collection of multiple data elements having the formats of a defined data elements, and an item providing component 333 for providing the item to the item receiving component 323 of the data value transfer system 320.

The data value transfer application interface 331 at an application 330 may provide a retrieving component 334 for retrieving an item of values of data elements from the item storing component 326 and an autocomplete component 335 for adding the values of the retrieved item to fields in the application 330. A confirmation component 336 may be provided for accepting or declining the autocomplete value suggestions.

The data value transfer application interface 331 at an application 330 may also include an application configuration component 337 for configuring whether or not the application can provide and retrieve items from the data value transfer system 320.

Figure 4:
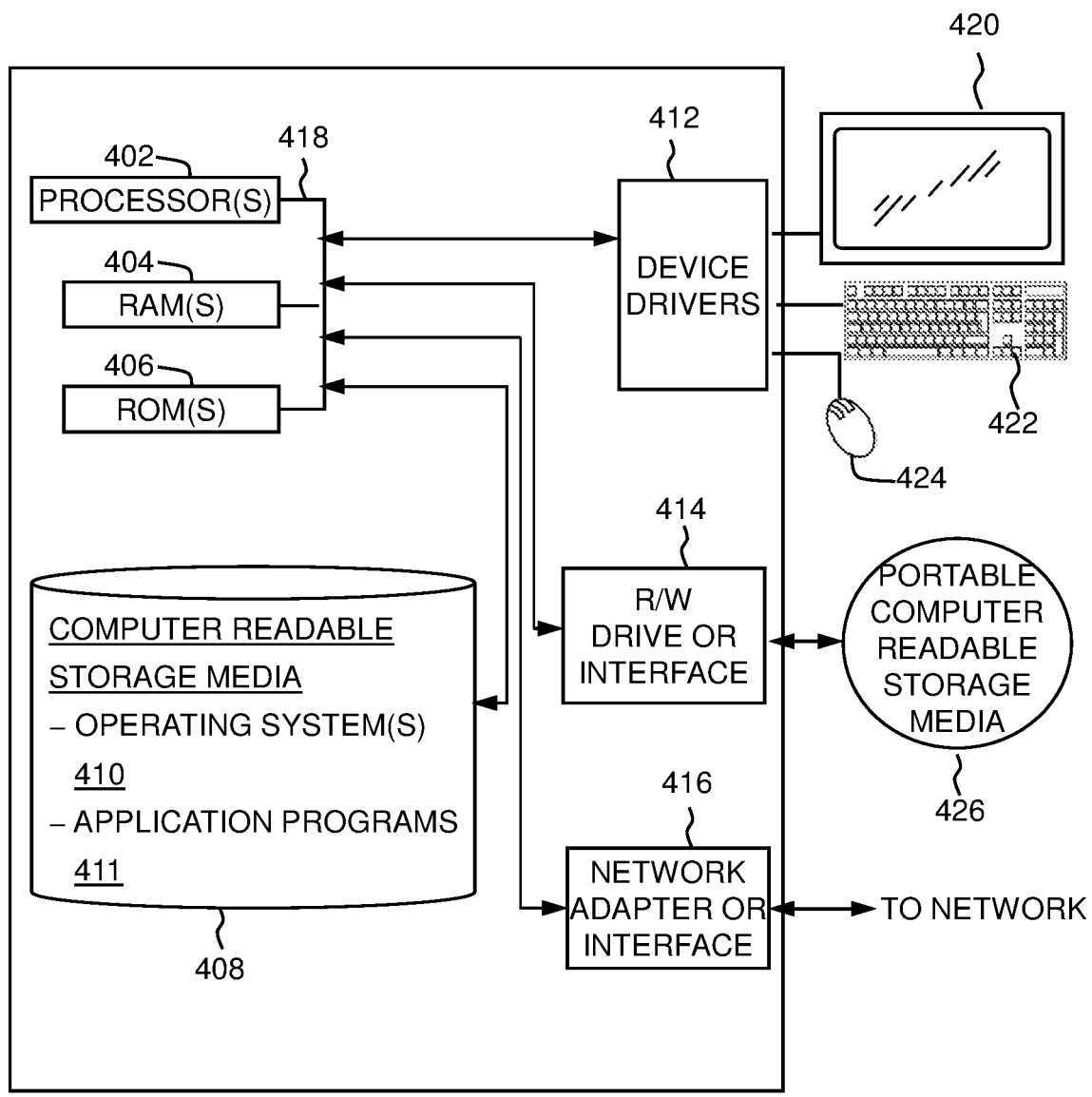
FIG. 4 is a block diagram of an example embodiment of a computer system in which the present invention may be implemented.

FIG. 4 depicts a block diagram of components of a computing system as used for the computing device 300, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

The computing system can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, such as are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 414 to read from and write to one or more portable computer readable storage media 426. Application programs 411 on the computing system can be stored on one or more of the portable computer readable storage media 426, read via the respective R/W drive or interface 414 and loaded into the respective computer readable storage media 408.

The computing system can also include a network adapter or interface 416, such as a TCP/IP adapter card or wireless communication adapter. Application programs 411 on the computing system can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

The computing system can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The computing system may be a communication device a smart phone or a computing device having a phone capability and including a communication element for connection to communication channels (e.g., a cellular telephone network, data transmission network, Wi-Fi network, satellite-phone network, Internet network, Satellite Internet Network, etc.).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for sharing data structure values between applications via messaging in a computer operating system, comprising:
    defining a plurality of data structures each with a given topic name, a data structure including a collection of defined formats of multiple data elements, each of the given topic names having multiple fields in a form of data elements with each data element having a defined format;
    defining a group of related fields from the multiple fields as a single data structure where each data structure is a collection of data input fields in a defined format from the collection of defined formats;
    registering interest by applications in topics;
    identifying within an application a collection of multiple data elements having the formats of a defined data structure of the plurality of data structures and storing an item in association with the given topic name of the defined data structure, wherein the item is a collection of data values of the identified data elements of the group of the related fields thereby defining the group of the related fields as the single data structure, and wherein the given topic name is a publish/subscribe message topic such that the data values are published and stored on an operating system level, the defined data structure is a collection of data input fields in the form of a defined format including strings of characters;
    making the item available to an application registered to the publish/subscribe message topic for input of the values in the defined data structure in the application, in response to relevant data structures being identified in the application; and
    retrieving the relevant data structures, in response to the application being registered to the publish/subscribe message topic;
    wherein the messaging includes publish/subscribe messaging infrastructure provided by an operating system, and the publish/subscribe messaging infrastructure includes registering interest by applications which registers subscribers to a topic, and publishes the item to a topic queue for sending to subscribing applications;
    defining the topic queue for a defined data structure on installation of an application, and the operating system putting items in the form of a collection of data values for the defined data structure directly onto the topic queue for the application; and
    managing, using the operating system, a table of applications and topics the applications declared interest and support for, wherein when the operating system sees a matching data structure, the operating system finds a topic name for the matching data structure and pushes structure contents of the matching data structure to applications declaring support for the topic.

2. The method as claimed in claim 1, wherein the data elements in the defined data structure each have labels that are matchable to user interface labels in a receiving application to autocomplete fields with the data values of the data elements provided in the item.

3. The method as claimed in claim 1, wherein the defined formats of the data elements include one or more of the group of: strings of character types; arrangements of character types; image data types; and metadata attributes.

4. The method as claimed in claim 1, wherein storing an item in association with the given topic name stores the item for a configured duration and/or number of stored items of the topic name.

5. The method as claimed in claim 1, wherein identifying within an application a collection of multiple data elements includes providing an application interface to and using pattern recognition for the data elements within the application.

6. The method as claimed in claim 1, including defining a data structure by a user with a user configured topic name.

7. The method as claimed in claim 1, including configuring at the operating system, applications that are permitted to register interest in topics and/or provide items for a topic and exposing a list of topic names to a user together with registered interests by application for access control by the user.

8. The method as claimed in claim 1, including configuring, at an application, whether or not the application can register interest in topics and/or provide items for a topic.

9. The method as claimed in claim 1, wherein sending the item to an application includes an application pulling items periodically for a topic.

10. A system for sharing data structure values between applications via messaging in an operating system, comprising:
    a processor and a memory configured to provide computer program instructions to the processor to execute the function of the components of a data value transfer system, the components comprising:
    a data structure defining component for defining a plurality of data structures each with a given topic name, a data structure including a collection of defined formats of multiple data elements, each of the given topic names having multiple fields in a form of data elements with each data element having a defined format;
    a group of related fields from the multiple fields being defined as a single data structure where each data structure is a collection of data input fields in a defined format from the collection of defined formats;

a topic component for registering interest by applications in topics;

an identifying component for identifying within an application a collection of multiple data elements having the formats of a defined data structure of the plurality of data structures;

an item storing component for storing an item in association with the given topic name of the defined data structure, wherein the item is a collection of data values of the identified data elements of the group of the related fields thereby defining the group of the related fields as the single data structure, and wherein the given topic name is a publish/subscribe message topic such that the data values are published and stored on an operating system level, the defined data structure is a collection of data input fields in the form of a defined format including strings of characters;

an item access component for making the item available to an application registered to the publish/subscribe message topic for input of the values in a corresponding data structure in the application, in response to relevant data structures being identified in the application;

the application retrieving the relevant data structures, in response to the application being registered to the publish/subscribe message topic;

wherein the messaging includes publish/subscribe messaging infrastructure provided by an operating system, and the topic component for registering interest by applications registers subscribers to a topic, and the item storing component for storing an item publishes an item to a topic queue for sending to subscribing applications;

the topic queue being defined for a defined data structure on installation of an application, and the operating system putting items in the form of a collection of data values for the defined data structure directly onto the topic queue for the application; and using the operating system, managing a table of applications and topics the applications declared interest and support for, wherein when the operating system sees a matching data structure, the operating system finds a topic name for the matching data structure and pushes structure contents of the matching data structure to applications declaring support for the topic.

11. The system as claimed in claim 10, wherein the data structure defining component includes providing the data elements in the defined data structure in association with labels that are matchable to user interface labels in a receiving application to autocomplete fields with the data values of the data elements provided in the item.

12. The system as claimed in claim 10, wherein the item storing component stores an item in association with the given topic name and stores the item for a configured duration and/or number of stored items of the topic name.

13. The system as claimed in claim 10, including a configuration component for configuring at the operating system, applications that are permitted to register interest in topics and/or provide items for a topic and exposing a list of topic names to a user together with registered interests by application for access control by the user.

14. The system as claimed in claim 10, including an application interface component for interfacing with the data value transfer system including an item providing component for providing items for a topic and a retrieving component for retrieving an item for a topic.

15. The system as claimed in claim 14, wherein the application interface component includes a pattern recognition component for identifying within an application a collection of multiple data elements having the formats of a defined data elements.

16. The system as claimed in claim 14, wherein the application interface component includes an autocomplete component for matching labels of data element values of an item to user interface labels to autocomplete fields with the data element values in the application.

17. The system as claimed in claim 10, including a confirmation component for prompting a user input to confirm or deny the autocomplete fields in an application.

18. A computer program product for sharing data structure values between applications via messaging in an operating system, the computer program product comprising a computer readable storage medium having program instructions embodied therewith, the program instructions executable by a processor to cause the processor to:

define a plurality of data structures each with a given topic name, a data structure including a collection of defined formats of multiple data elements, each of the given topic names having multiple fields in a form of data elements with each data element having a defined format;

a group of related fields from the multiple fields being defined as a single data structure where each data structure is a collection of data input fields in a defined format from the collection of defined formats;

register interest by applications in topics;

identify within an application a collection of multiple data elements having the formats of a defined data structure of the plurality of data structures and storing an item in association with the given topic name of the defined data structure, wherein the item is a collection of data values of the identified data elements of the group of the related fields thereby defining the group of the related fields as the single data structure, and wherein the given topic name is a publish/subscribe message topic such that the data values are published and stored on an operating system level, the defined data structure is a collection of data input fields in the form of a defined format including strings of character;

make the item available to an application registered to the publish/subscribe message topic for input of the values in a corresponding data structure in the application, in response to relevant data structures being identified in the application;

retrieve the relevant data structures, in response to the application being registered to the publish/subscribe message topic;

wherein the messaging includes publish/subscribe messaging infrastructure provided by an operating system, and the publish/subscribe messaging infrastructure includes registering interest by applications which registers subscribers to a topic, and publishes the item to a topic queue for sending to subscribing applications;

defining the topic queue for a defined data structure on installation of an application, and the operating system putting items in the form of a collection of data values for the defined data structure directly onto the topic queue for the application; and managing, using the operating system, a table of applications and topics the applications declared interest and support for, wherein when the operating system sees a matching data structure, the operating system finds a topic name for the matching data structure and pushes structure contents of the matching data structure to applications declaring support for the topic.

* * * * *